United States Patent Office 3,520,372
Patented July 14, 1970

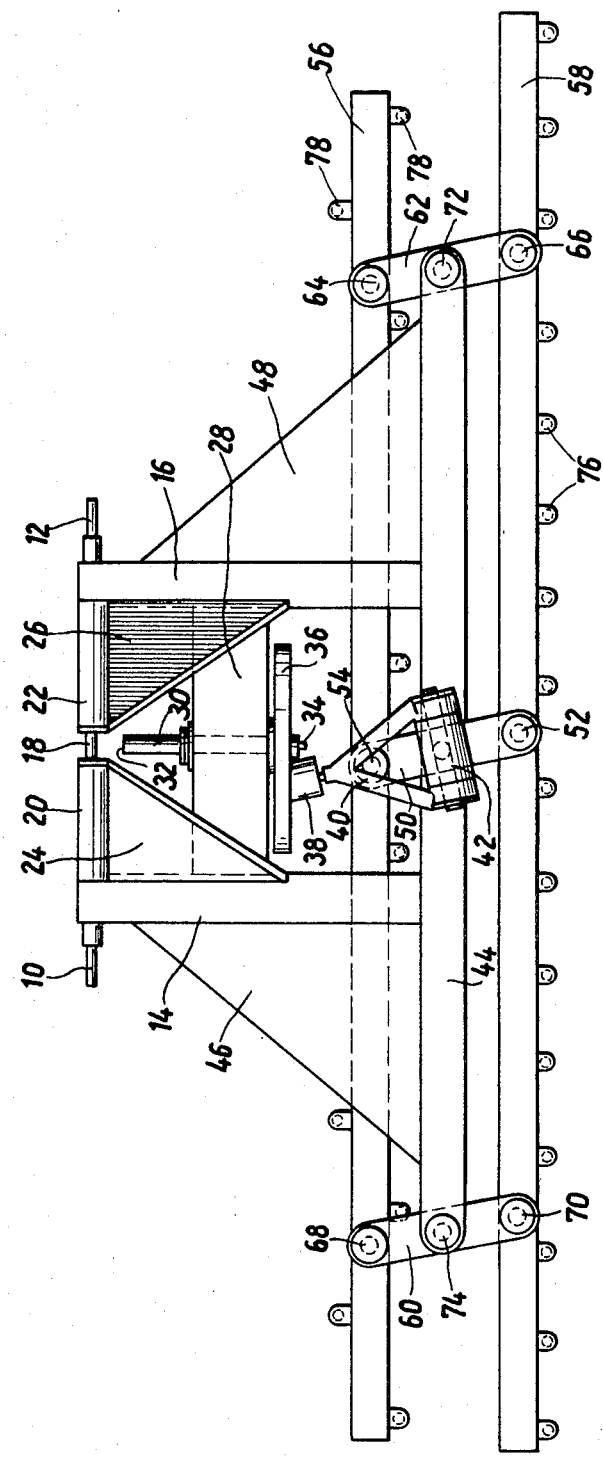

3,520,372
TRACTOR DRIVEN VIBRATORY HARROW
Ernst Beck, 18 Hauptstrasse, 7151 Lutzenberg, Germany
Continuation-in-part of application Ser. No. 587,463, Oct. 18, 1966. This application Dec. 23, 1968, Ser. No. 805,066
Claims priority, application Germany, Oct. 29, 1965, 1,258,645
Int. Cl. A01b *39/10*
U.S. Cl. 172—101        14 Claims

ABSTRACT OF THE DISCLOSURE

A harrow used to break up and pulverize the soil is adapted to be pulled by a tractor. The harrow includes a gyratory disk rotated at high speed by a shaft adapted to be connected, directly or indirectly, to the power take-off of the tractor.

---

This application is a continuation-in-part application based upon the applicant's U.S. patent application Ser. No. 587,463, filed Oct. 18, 1966, for "Tractor Driven Vibratory Harrow" and now abandoned.

The present invention relates to agricultural machinery and more particularly to a vibratory harrow adapted to be pulled by a tractor.

A harrow is an agricultural implement having cross-members set with spike-like teeth or disks. It is used to break up and pulverize the soil.

It is known that harrows adapted to be pulled by tractors may have a vibratory motion imparted to their teeth. This vibration breaks up the soil as the harrow is pulled along. The power for such a vibratory harrow is taken from the rear end power take-off of the tractor. This power take-off may be an extension of the main drive shaft of the tractor. The power take-off shaft of the tractor is connected to a drive shaft of the harrow.

In one type of conventional harrow, the drive shaft has an eccentric crank arm. A rocker on the harrow is connected to the end of the crank arm. As the crank arm moves in a complete circle, the rocker arm is pivotly restrained so that it only moves from side to side. The rocker's movement causes the cross beams of the harrow, and the teeth attached to those beams, to vibrate. In one type of proposed harrow, rockers on the harrow are connected eccentrically to a wheel driven by the harrow's drive shaft. The shaft is not driven at a sufficient speed and the wheel does not have sufficient mass to provide a gyratory effect steadying the harrow.

Known vibratory harrows of this kind may be connected indirectly, through reducing gears and a rocker, to the drive shaft of a tractor, which may operate, for example, at a standard speed of rotation of 540 revolutions per minute. It is desirable that the vibrations be at a high frequency which sets very high requirements for construction of the vibratory harrow. The relatively large number of harrow teeth fastened to the vibratory harrow beam do not always have the proper positive grip in the soil even under push-pull operation. This causes the vibratory harrow to become unsteady. The tractor must absorb the resulting impacts via the articulation device of the vibratory harrow. The tractor and also the articulation device is put under an undesirable load. This load may even be such that in the course of time, in a tractor having three-point articulations, the joint pins will be worn down more than is permissible. The known devices are unsatisfactory in that the harrow is itself not steady. In addition, the harrow does not absorb jolts and other unsteadiness but transmits them to the harrow's connection with the tractor.

It is the objective of the present invention to provide a vibratory harrow which is steady in operation, which is steady at a high working frequency and even more steady as the working frequency increases. It is the further objective of the present invention that the harrow should be equal to the requirements of agricultural operation and that its cost should not be substantially greater than that of other vibratory harrows.

In accordance with the present invention, a vibratory harrow is constructed with articulation joints adapted to be connected to a tractor. The harrow has a drive shaft adapted to be connected to the power take-off of the tractor. A gyratory disk is connected, directly or indirectly, to the drive shaft. The disk is of sufficient weight, with most of its weight toward its perimeter, so that it has a high angular momentum when rotated to obtain a gyratory effect. The gyratory effect is that any motions other than (1) rotation of the disk about its shaft, (2) all translatory movements of the gyratory disk, are strongly resisted by the force of gyration. A rocker is eccentrically connected to the drive shaft and is driven from side to side. The harrow beams are pivotally connected to the rocker for sidewise motion. A large plurality of spike-like teeth extend from the harrow beams. The teeth bite into the ground due to the weight of the harrow and because of pressure provided by a hydraulic means, and they vibrate due to their connection to the rocker arm.

It is preferred that the gyratory disk be directly fixed on the drive shaft of the harrow. It is also preferred that the rocker be eccentrically connected to the gyratory disk. In this preferred construction, the gyratory disk performs two functions: first, to steady the harrow and, second, as a crank arm to move the rocker from side to side. The number of parts does not increase in this preferred construction, as the usual crank arm is replaced by the gyratory disk. Preferably the gyratory disk is rotatably pivoted on an anti-friction bearing supported between the harrow beams and the harrow's articulation with the tractor.

The effect of the gyratory disk keeps the harrow steady even at a high vibratory frequency. The jolts and shocks and other unsteadiness picked up by the harrow's teeth are not transmitted to the harrow's articulation with the tractor. In addition, the tractor power take-off shaft has a relatively constant load without dead centers.

Other advantages, objectives and characteristics of the invention will be evident from the following description of a preferred embodiment of the present invention, taken in conjunction with the single figure of the accompanying drawing. The figure shows a vibratory harrow in top plan view, almost true to scale.

As shown in the drawing, two link bolts 10 and 12 are fastened to two parallel extending longitudinal beams 14 and 16. Bolts 10 and 12 constitute two of the attachment points for a tractor three-point articulation. The third point of attachment is the link bolt 18. Link bolt 18 is fastened to struts 20 and 22, which are welded to the longitudinal beams 14 and 16, respectively. Triangular plates 24 and 26 are welded to the struts 20 and 22 on their one side, and to the longitudinal beams 14 and 16 on their other side at their marginal areas extending at right angles to each other. These plates 24 and 26 provide reinforcement of the struts 20 and 22 with the longitudinal beams 14 and 16.

A box-shaped transverse support structure 28 is at its two ends welded between the longitudinal beams 14 and 16. It contains an anti-friction bearing (not shown) for a drive shaft 30. Drive shaft 30 is adapted for connecting with a drive shaft (output shaft) of a tractor. The end 32 of shaft 30 faces the three-point articulation. A gyratory disk 36 is mounted so that it does not rotate on shaft 30. The disk 36 is constructed so that most of its mass is close to its periphery (external circumference). It consequently has a large angular moment and a high angular momentum. Disk 36 is mounted on the butt-end of shaft 30 beyond the transverse support 28 (first transverse support beam) on the side opposite the three-point articulation.

A lug 38 having a universal or spherical bearing is fixed eccentrically on disk 36. Lug 38 is connected rotatably to one end of a rocker 40, which is of fork shape. The fork ends of the rocker 40 are connected together by a pivot pin (shown in dotted lines). The pivot pin is pivotally mounted through transverse cross-member 42.

The cross-member 42, in turn, is non-rotationally connected with a pivot pin (shown in dotted lines) extending perpendicularly in the normal position of use of the vibratory harrow. This pivot pin extends through supporting beam 44 (second transverse support beam) approximately in its central region.

The supporting beam 44 in turn is welded to the longitudinal beams 14 and 16, respectively. Two triangular plates 46 and 48 connect the supporting beam 44 and the longitudinal beams 14 and 16, respectively, for stiffening purposes.

The pivot pin goes through the supporting beam 44, so that it rotates within the beam, and at its end protrudes beyond the underside of the supporting beam 44. A pivot arm 50 is non-rotationally fixed to the pivot pin at its end. Pivot arm 50 acts as a double oscillating lever, whose free ends are pivotly connected through pins 52 and 54 with vibratory harrow beams 56 and 58. The vibratory harrow beams 56 and 58 are guided straight by rocker arms 60 and 62, which are not driven. The rocker arms 60 and 62 utilize pin connections 64, 66 and 68, 70, respectively, at their ends, and similar pin connections 72 and 74 at the ends of the supporting beam 44. The vibratory harrow beams 56 and 58 carry a plurality of harrow teeth 76, 78, only a few of which are illustrated. The $x$-axis is horizontal, relative to the ground, and the $y$-axis is vertical. The teeth 76, 78 are perpendicular to the plane of beams 56, 58, i.e., in the direction into the drawing.

The disk 36 acts as a gyroscope and functions to keep the harrow steady at a high frequency of vibration, as distinct from the purpose of a fly-wheel which is to retain sufficient momentum to overcome unbalances in a motor or transmission. The disk 36 attains a high angular momentum, which in its gyratory effect opposes all angular motion of its axis, i.e., it opposes all motion except translatory motions.

It is assumed that the harrow is rotatably suspended in the zero point of the standard coordinate system and its rotary motions about the $x$-axis and $y$-axis be small. The rotary motions of the entire harrow can then be described approximately by the coupled differential equations:

(I) $\quad J_x\ddot{\alpha}+H\dot{\beta}=M_x$ (II) $\quad I_y\ddot{\beta}-H\dot{\alpha}=M_y$ wherein $J_x$=moment of inertia of the harrow+disk 36 about the $x$-axis;
$I_y$=moment of inertia of the harrow+disk 36 about the $y$-axis;
$\alpha,\dot{\alpha},\ddot{\alpha}$=angle of rotation, speed of rotation and angular acceleration about the $x$-axis;
$\beta,\dot{\beta},\ddot{\beta}$=angle of rotation, speed of rotation and angular acceleration about the $y$-axis;
$M_x$=outer moments acting about the $x$-axis;
$M_y$=external moments acting about the $y$-axis;
$H$=angular momentum of the gyroscope disk 36.

The stabilizing effect of the disk of the harrow is given by the gyroscopic couples $H\dot{\alpha}$ and $H\dot{\beta}$. The factors which are decisive for the size of these gyroscopic couples are (1) the speeds of rotation $\dot{\alpha}$ and (2) $\dot{\beta}$ the angular momentum H of the gyro, $H=T\omega$ wherein:

T=inertia tensor of the gyro
$\omega$=rotating speed vector

If the disk is assumed as being a homogeneous circular cylinder, then its angular momentum (III) $\quad H=\dfrac{8}{g}\cdot\dfrac{\pi l}{2}(R^4-r^4)\dfrac{\pi n}{30}=\dfrac{G}{g}\left(\dfrac{R^2+r^2}{2}\right)\dfrac{\pi n}{30}$ wherein 8=spec. weight of the gyro
$g$=acceleration to gravity
$l$=length of the gyro
$R$=outer radius of the gyro
$r$=inner radius of the gyro
$n$=speed of gyro in r.p.m.
$G$=weight of the gyro The size of the angular momentum H can be influenced by a change of the speed of the disk and/or by a change of its mass distribution. A change of the mass distribution need, however, not be connected with a change of its total weight.

In a preferred and particular example of construction, the total harrow width was about 8.2 feet (2500 mm.). The weight of the harrow was 440 pounds avoir. (200 kg.). The gyratory disk 36 weighed 55 pounds avoir. (25 kg.), had a diameter of 1.48 feet (450 mm.) and was driven at the nominal shaft speed of 540 r.p.m. directly by the drive shaft of a tractor. The beams used had a box profile (cross-section). Utilizing the data of this preferred example of construction, and the formulas set forth above:

(IV)

$$H=\dfrac{25\text{ kg.}}{9.81}\cdot\dfrac{\text{m.}}{\text{sec.}}\cdot\dfrac{(0.225\text{ m.})^2}{2}\cdot\dfrac{3.14\cdot 540}{30\text{ sec.}}=3.64\text{ kg. msec.}$$

Therefore the steadying force of the disk of the preferred embodiment is 143 kg. msec. This *force* (and not the weight of the disk) may be compared to the harrow's weight G (V)

$$\dfrac{H}{G}=\dfrac{3.64\text{ kg. msec.}}{200\text{ kg.}}\approx 0.0018\text{ msec.}=0.05\text{ inch sec.}$$

In practice, the speed may be somewhat reduced, for example, to 400 r.p.m.; or the mass of the disk 36 somewhat reduced compared to the weight of the harrow, and beneficial results still obtained. However, it has been found that the lowest practical limit of the H/G ratio is 0.00128 msec.=0.07 inch sec.

It is desirable that the gyratory disk be rotated parallel to the direction of sidewise movement of the vibratory harrow beams. This direction best permits it to absorb the impacts originating from the vibratory harrow beams. In the construction of the preferred embodiment, it is not necessary to have intermediate gears for the drive of the gyratory disk. Instead, the gyratory disk is fixed on a drive shaft which is approximately parallel with the take-off shaft of the tractor or aligned therewith.

Preferably the gyratory disk is located at about mid-distance between the pivot pin of the rocker and the lower articulation of a tractor three-point articulation. There is usually enough space for the gyratory disk at this location in many conventional harrow constructions. In addition, the disk can readily be used there for the fulfillment of its second main task, the driving of the rocker.

A very stable and compact construction is obtained if the gyratory disk is mounted on a transverse beam which is fastened at its ends to two longitudinal beams originating from the lower articulation and directly or indirectly carrying at their free ends the vibratory harrow beams. A lower load on the bearing results when the gyratory disk is located behind the transverse beam as seen from the tractor.

As was mentioned above, if a harrow is operated with a crank disk which does not have the effect of the gyratory disk 36, then the harrow puts the entire harrow construction, and in particular the link bolts 10, 12 and 18, under very heavy load. When using the arrangement according to the present invention, the harrow is very steady at high speeds. This steadiness is so great that rust, which occasionally has deposited on the link bolts 10, 12 or 18, has not been rubbed off despite the operation of the vibratory harrow.

Moreover, using the present invention, there may even be a shift of the tractor shaft speed to high, so that the harrow as a whole is operated at a higher speed. Experiments with harrows driven at more than 1000 cycles have proven very successful—even for hard and heavy soils. If the power tractor take-off furnishes a speed of 1000 r.p.m. or the like, a transmission is, of course, not necessary.

Modifications may be made in the present invention within the scope of the subjoined claims. For example, the embodiment shown in the drawing may be modified in that disk 36 is replaced by a crank arm. In such a modification, the gyratory disk must then be provided separately, for example, on an extension of shaft 30 or on a separate shaft geared to shaft 30. As another alternative, the harrow beams may be driven at a different, e.g., a lower, frequency than the gyratory disk. An intermediate gear would then be advisable to provide a transmission between the drive shaft and the disk.

I claim::

1. A vibratory harrow adapted to be removably connected to a tractor, including
   a support structure, means attached to said support structure for removably attaching the harrow to a tractor,
   a harrow drive shaft rotatably mounted on said support structure, said drive shaft being adapted to be removably connected to and driven by a power take-off shaft of a tractor,
   a harrow beam connected to said support structure for vibratory motion, said beam having affixed thereto a plurality of projecting harrowing means,
   motion transmitting means connected between said harrow beam and said harrow drive shaft, and
   said motion transmitting means further including a gyratory disk connected to said harrow drive shaft and adapted to be rotated at over 400 r.p.m., said motion transmitting means rotating said disk at over 400 r.p.m. when tilling the soil, said disk having its mass distributed and being of a relatively large mass in relationship to the harrow so that said disk attains upon rotation sufficient angular momentum to provide a gyratory effect to steady the harrow;
   wherein the weight of the harrow G including the said gyratory disk is in the ratio of at least $H/G=0.05$ inch second at 400 r.p.m.;
   where H is the angular momentum of the gyratory disk.

2. A vibratory harrow as in claim 1 wherein said gyratory disk is fixed on said harrow drive shaft.

3. A vibratory harrow as in claim 1 wherein said gyratory disk is fixed to a second shaft, said second shaft is rotatably mounted on said support, and a gear means connects said harrow drive shaft and said second shaft.

4. A vibratory harrow as in claim 1 wherein said connection means to said harrow beam is connected eccentrically to said disk and said disk drives said connection means.

5. A vibratory harrow as in claim 1 wherein said connection means to said harrow beam is a forked rocker.

6. A vibratory harrow as in claim 1 wherein said disk is mounted on said support between the connection means to the tractor and said harrow beam.

7. A vibratory harrow as in claim 1 wherein said disk is rotatable in a substantial parallel relationship to said harrow beam.

8. A vibratory harrow as in claim 1 wherein the connection means to the tractor is a three-point articulation, the connection means to the harrow beam is a rocker mounted on a pivot pin and said disk is rotatably mounted substantially at the mid-point between said pivot pin and the lower connections of said three-point articulation.

9. A vibratory harrow as in claim 1 wherein said support includes first and second transverse supporting beams and two longitudinal beams, one of said transverse beams carrying said harrow beam.

10. A vibratory harrow as in claim 9 wherein said disk is located behind said first transverse beam viewed from said tractor connection means.

11. A vibratory harrow as in claim 1 wherein said disk has a weight of substantially 25 kg., a diameter of 450 mm., and the harrow has a weight of 200 kg.

12. A vibratory harrow as in claim 1 wherein the mass of said disk is greater than 10% of the mass of the harrow.

13. A vibratory harrow adapted to be removably connected to a tractor, including
   a support structure, means attached to said support structure for removably attaching the harrow to a tractor,
   a harrow drive shaft rotatably mounted on said support structure, said drive shaft being adapted to be removably connected to and driven by a power take-off shaft of a tractor,
   a harrow beam connected to said support structure for vibratory motion, said beam having affixed thereto a plurality of projecting harrowing means, and
   motion transmitting means connected between said harrow beam and said harrow drive shaft,
   said motion transmitting means including a gyratory disk connected to said harrow drive shaft, said motion transmitting means rotating said disk at over 400 r.p.m. when tilling the soil, said disk being adapted to be rotated at over 400 r.p.m. and having its mass distributed and being of a relatively large mass in relationship to the harrow so that said disk attains upon rotation sufficient angular momentum to provide an effect to steady the harrow,
   wherein said motion transmitting means to the harrow beam further includes a rocker movably secured to said disk, the movement of said rocker being such that one of its ends traces a cone whose axis is substantially parallel to said harrow drive shaft, the tip of said cone being located substantially at a pivot pin for said rocker, and said pivot pin being connected to an arm which is pivotly connected to said harrow beam.

14. A vibratory harrow as in claim 13 wherein said disk forms the base of said cone.

References Cited

UNITED STATES PATENTS

| 50,478 | 10/1865 | Jillson | 172—102 |
|---|---|---|---|
| 380,883 | 4/1888 | Gardner | 172—102 |
| 862,453 | 8/1907 | Doty | 172—102 |
| 1,590,498 | 6/1926 | Counts | 172—102 |
| 3,186,495 | 6/1965 | Gijzenberg | 172—102 |

FOREIGN PATENTS

| 65,582 | 7/1914 | Austria. |
|---|---|---|
| 1,308,664 | 10/1962 | France. |
| 419,620 | 10/1925 | Germany. |
| 522,727 | 4/1955 | Italy. |

ROBERT E. PULFREY, Primary Examiner

A. E. KOPECKI, Assistant Examiner

U.S. Cl. X.R.

172—53